(12) United States Patent
Fang

(10) Patent No.: US 8,319,754 B2
(45) Date of Patent: Nov. 27, 2012

(54) TOUCH SCREEN PEN FOR CAPACITIVE TYPE TOUCH SCREEN

(76) Inventor: Te-Hsiang Fang, Taipei County (TW)

(*) Notice: Subject to any disclaimer, the term of this patent is extended or adjusted under 35 U.S.C. 154(b) by 312 days.

(21) Appl. No.: 12/843,051

(22) Filed: Jul. 26, 2010

(65) Prior Publication Data

US 2011/0316815 A1   Dec. 29, 2011

(30) Foreign Application Priority Data

Jun. 29, 2010  (TW) .............................. 99212263 U

(51) Int. Cl.
  *G06F 3/033*   (2006.01)
(52) U.S. Cl. ...................................................... 345/179
(58) Field of Classification Search .......... 345/156–158, 345/179; 178/18.01, 19.01–19.05
  See application file for complete search history.

(56) References Cited

U.S. PATENT DOCUMENTS

| 2002/0181997 | A1* | 12/2002 | Konose ........................ 401/224 |
| 2008/0266267 | A1* | 10/2008 | Chang ........................... 345/173 |
| 2009/0262637 | A1* | 10/2009 | Badaye et al. ................ 369/126 |
| 2009/0266626 | A1* | 10/2009 | Robb et al. ................. 178/19.01 |

* cited by examiner

*Primary Examiner* — Amr Awad
*Assistant Examiner* — Kenneth Bukowski

(57) ABSTRACT

The screen touch pen used for inputting commands to a capacitive type touch screen, comprising a pen-tip having a first portion and a second portion along an axial direction, the first portion of the pen-tip being exposed for inputting commands to the capacitive type touch screen, wherein a portion of the pen-tip contacting with the capacitive type touch screen is made of an electrically-conductive fabric.

8 Claims, 3 Drawing Sheets

TOUCH SCREEN PEN FOR CAPACITIVE TYPE TOUCH SCREEN

CROSS-REFERENCE TO RELATED APPLICATION

Figure 1:
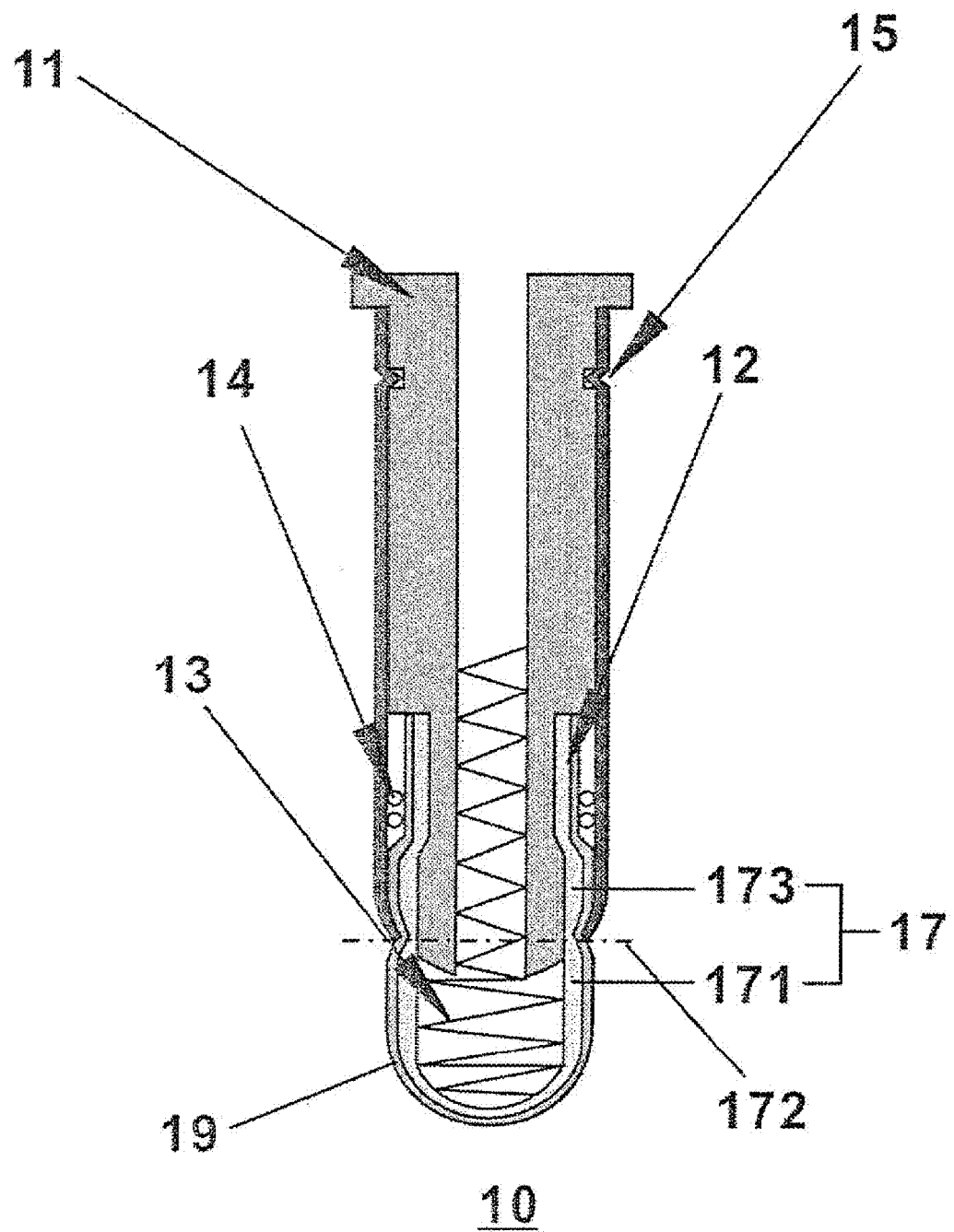

This utility application claims priority to Taiwan application serial number 099212263, filed Jun. 29, 2010, which is incorporated herein by reference.

BACKGROUND OF THE INVENTION

1. Field of the Invention

This present invention relates to a pen or stylus for inputting commands to the user's interface shown on touch screen, and in particular as the touch screen is in form of a capacitive type, its corresponding touch screen pen.

2. Description of the Prior Art

Due to high satisfactions of functionalities of touch screen input apparatus, the mobile phones or computers of the type have been widely quested by fans for high-tech devices. Some examples of these are iPhone, iPad marketed by Apple (Brand Name)

In general, to operate those apparatus, the users use their bare fingers. Under the typical situations, the touch screen pens are not needed at all. However, different people have different diameter size of each finger. As the finger is used to write alphabets or multiple-stroke characters (Chinese) on the touch screen to make word-notes, larges thumbs or large forefingers might cause difficulty during the character-recognition process. In addition, in summer days users easily sweat a lot making finger-input an unpleasant experience. Furthermore, some of female teenagers of this generation used to wear artificial colorful fingernails which are usually longer than their front part of each finger. Under those special conditions, the fingers can not command the apparatus well.

With regard to the resistive type touch screen, the corresponding touch screen pen tips can be made much smaller which allows more icons of smaller size on the user interface. But the pen tips of resistive type pen can not be utilized on the capacitive type touch screen due to entirely different operational principles.

There are also two different categories of capacitive type touch screen pen. One kind of them uses the static electricity of human body and conveys the static electricity via touch screen pen to the surface of touch screen altering the voltage of the substrates constituting the capacitive type touch screen. No command operation may be made when the users wear the gloves during the severe winter days.

Another type of them has design inside itself which induces electric field used to alter the voltage of the substrates constituting the capacitive type touch screen. The command operations may still be made even the users wear the gloves during the severe winter days.

DAGI (Brand Name) capacitive touch screen pen found in the marketplace with transparent pen-tip has following virtues: (1) Blocking the users' sight focus over the interface is avoided, the effective prevention of accidental touch (actuation) is possible; (2) Consumption of no power; (3) High precision inputs suitable for selecting and activating smaller icons while surfing the Web pages and for word processing purpose; (4) Suitability for character recognition. However, there is a need for improving the life cycle of the transparent pen-tip.

Nokia (Brand Name) has marketed the touch screen pen of part No. SU-36 which is applicable to mobile phone models of Nokia N8, X6 and also to other brands implementing the capacitive type touch screen.

The touch screen pen ST C400 (Brand Name) of Htc (Brand Name) utilizes magnetized pen-tip to produce corresponding current on the capacitive type touch screen while touching on the screen to manipulate the interface.

Taiwan Songtak Co. has added specialized ingredient into the PU material of pen-tip to extend the life cycle of the touch screen pen. This maker emphasizes the usage of the touch screen pen even the users wear gloves in winter days.

The touch screen pens TOUCH, TOUCH2, TOUCH3 (Brand Name) for Apple (Brand Name) iPhone 2G, 3G, 3GS have pen-tip utilizing the electrically-conductive rubber or soft foam. It is known that the pen-tip is made of carbon-rich rubber or soft foam. The surface of the touch screen should be kept clean and slick for smooth operation of the conductive rubber or soft foam.

Since the carbon-rich rubber or foam is anti-slip, the possible drawbacks as they are used for the pen-tips include the aging of the elasticity. To improve the electric conductive capability of rubber, carbon content should be high enough that makes the pen-tip harder easily scratching the touch screen.

U.S. Pat. No. 5,914,708 discloses a pen-tip made of the soft foam which is electrically-conductive.

To meet the needs which cure the defects mentioned above for the touch screen pen used with the capacitive type touch screen, the present invention intends to provide a novel solution.

SUMMARY OF THE INVENTION

In accordance with one aspect of the invention, the touch screen pen for use with the capacitive type touch screen includes a pen-tip, which along an axial direction has a first portion and a second portion. The first portion of the pen-tip is exposed for manipulating the capacitive type touch screen and the contact part of the pen-tip with the capacitive type touch screen consists of an electrically-conductive fabric.

In accordance with another aspect of the invention, the touch screen pen for manipulating the capacitive type touch screen includes an inner cylinder, the inner cylinder has an axial inner space for receiving a spring; a jacket sleeved onto the inner cylinder for being gripped by fingers of the user, wherein an accommodation space is provided between the jacket and the inner cylinder; and a pen-tip, which along its axial direction has a first portion, and a second portion disposed within the accommodation space, the second portion being depressed by the jacket making the pen-tip fixed to the touch screen pen. The first portion of the pen-tip is exposed with respect to the jacket for inputting commands to the capacitive type touch screen. The contact part of the pen-tip with the capacitive type touch screen consists of an electrically-conductive fabric.

The aspect of the present invention will no doubt become apparent to those of ordinary skill in the art after reading the following detailed description of the preferred embodiment, which is illustrated in the following figures and drawings.

BRIEF DESCRIPTION OF THE APPENDED DRAWINGS

Figure 2:
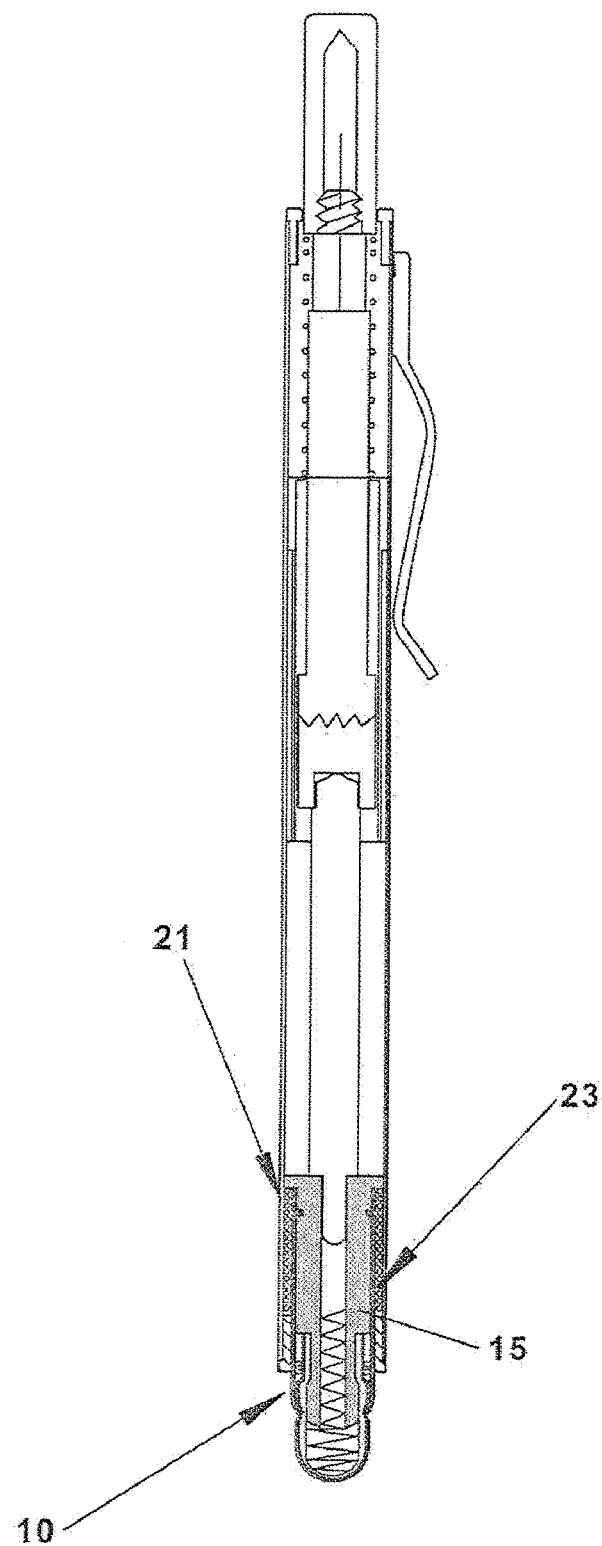
Figure 3:
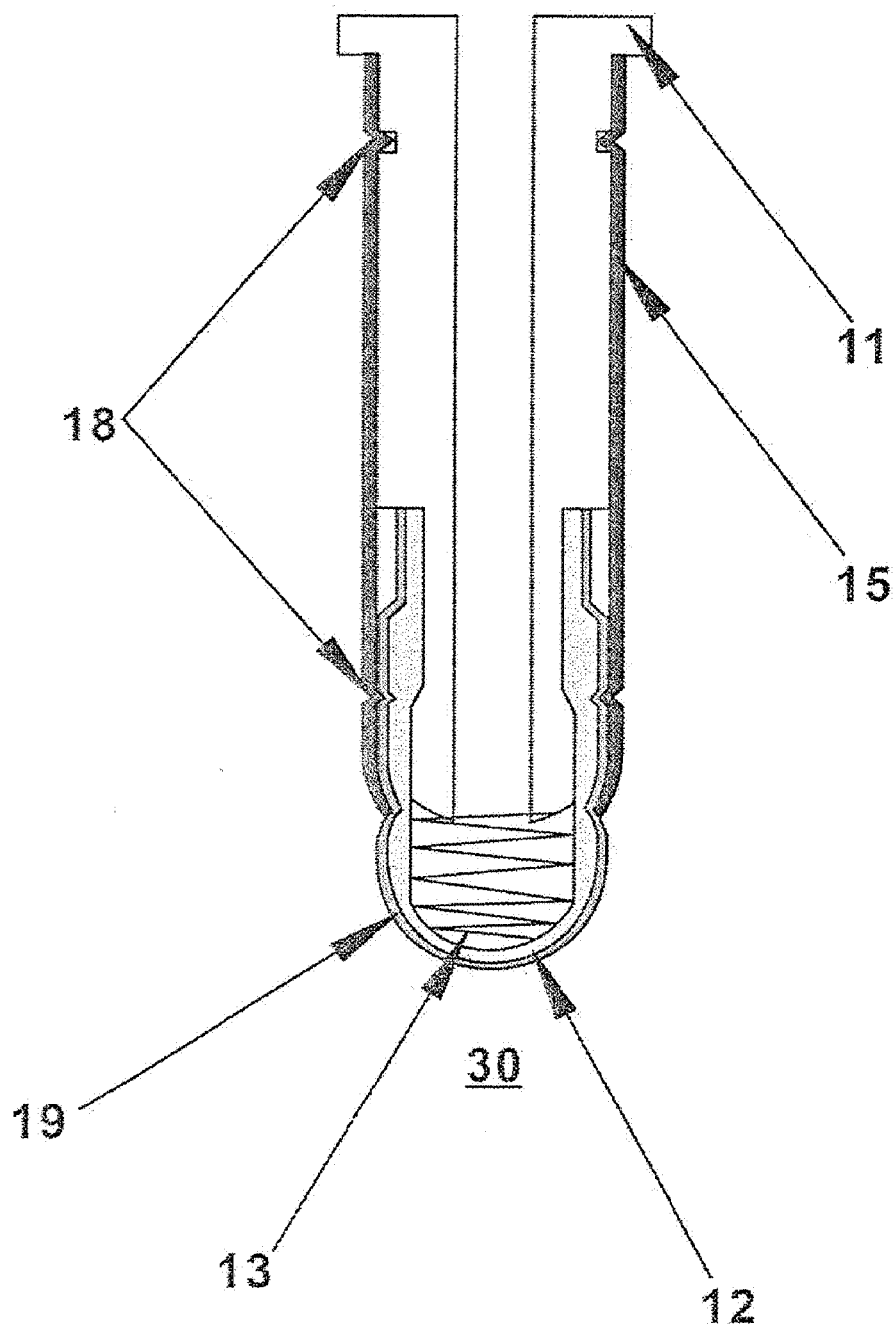

FIG. 1 shows the touch screen pen of first embodiment.
FIG. 2 shows the touch screen pen of second embodiment.
FIG. 3 shows the touch screen pen of third embodiment.

DETAILED DESCRIPTION OF THE INVENTION

Some preferred embodiments and practical applications of this present invention would be explained in the following paragraph, describing the characteristics, spirit and advantages of the invention.

As shown in FIG. 1, a touch screen pen 10 for use with a capacitive type touch screen is disclosed. The touch screen pen 10 includes an inner cylinder 11, a jacket 15 and a pen-tip 17. The inner cylinder 11 has an internal axial space for receiving a spring 13. The jacket 15 is sleeved onto the inner cylinder 11 for being gripped by the fingers of an user. Between the jacket 15 and the inner cylinder 11, an accommodation space exists. Along an axial direction, the pen-tip 17 substantially includes a first portion 171 and a second portion 173, the second portion 173 is disposed within the accommodation space and is depressed by the jacket 15 making the secure fixation of pen-tip 17 to the touch screen pen 10 possible. The first portion 171 of the pen-tip 17 is exposed with respect to the jacket 15 for inputting commands to the capacitive type touch screen. The contact portion between the pen-tip 17 and the capacitive type touch screen consists of an electrically-conductive fabric 19. The electrically-conductive fabric 19 may be woven fabric or may be non-woven fabric. The numeral 172 is the boundary of the first portion 171 and the second portion 173.

In alternative embodiments, the pen-tip 17 might further include the rubber cylinder 12, wherein the electrically-conductive fabric 19 is disposed to cover an external surface of the rubber cylinder 12. One end of the spring 13 touches against an inner bottom of the rubber cylinder 12 for providing elasticity to the pen-tip 17.

As seen from FIG. 1, the static electricity of the user is conducted to, via his/her fingers, the jacket 15, the electrically-conductive fabric 19 and the rubber cylinder 12, to the capacitive type touch screen (not shown).

In alternative embodiments, the touch screen pen 10 might further include a circumferential metal cord 14, which is disposed within the accommodation space, for tightening the second portion 173 to an external wall of the inner cylinder 11. This circumferential metal cord 14 provides additional conductive path for conducting the static electricity to the capacitive type touch screen (not shown).

In another perspective, the touch screen pen 10 of the first embodiment includes a pen-tip 17 which, along its axial direction, has a first portion 171 and a second portion 173. The first portion 171 of the pen-tip 17 is exposed for manipulating the user interface shown on the capacitive type touch screen. The contact part between the pen-tip 17 and the capacitive type touch screen consists of an electrically-conductive fabric 19. The numeral 172 is the borderline between the first portion 171 and the second portion 173. The electrically-conductive fabric 19 can be woven fabric or alternatively can be non-woven fabric.

Other than the embodiment of FIG. 1, as shown in FIG. 2, the touch screen pen 10 further includes an external tube 21. And a second accommodation space is provided between the external tube 21 and the jacket 15 for receiving an electrically-conductive spring 23. Under this design, the static electricity of human body is conducted to, via his/her fingers, the external tube 21, the electrically-conductive spring 23, the jacket 15, the rubber cylinder 12 and the electrically-conductive fabric 19, to the capacitive type touch screen (not shown). The electrically-conductive fabric 19 might be woven fabric or non-woven fabric. The elements in FIG. 2 corresponding to one shown in FIG. 1 respectively perform same functions, and the functions of that are not redundantly iterated herein.

As described above and illustrated also in the figures, since both embodiments provide multiple conductive paths, therefore the rubber cylinder 12 may be electrically-conductive or electrically-nonconductive depending on the design choice.

As shown in FIG. 3, a touch screen pen 10 of the third embodiment for use with a capacitive type touch screen is disclosed. The touch screen pen 30 includes an inner cylinder 11, a jacket 15 and a pen-tip 17 which includes the rubber cylinder 12 and the electrically-conductive fabric 19. The jacket 15 is sleeved onto the inner cylinder 11 for being gripped by the fingers of an user. Different from the embodiment of FIG. 1, a circumferential shrink groove 18 on the jacket 15 is provided to tighten the rubber cylinder 12 of the pen-tip 17. Similar to one shown in FIG. 1, along an axial direction, the pen-tip 17 substantially includes a first portion 171 and a second portion 173, the second portion 173 is disposed within an accommodation space between the jacket 15 and the inner cylinder 11 and is depressed by shrink groove 18 on the jacket 15 making the secure fixation of pen-tip 17 to the touch screen pen 10 possible. The first portion 171 of the pen-tip 17 is exposed with respect to the jacket 15 for inputting commands to the capacitive type touch screen. The contact portion between the pen-tip 17 and the capacitive type touch screen consists of the electrically-conductive fabric 19. The electrically-conductive fabric 19 may be woven fabric or may be non-woven fabric. The electrically-conductive fabric 19 is disposed to cover an external surface of the rubber cylinder 12. The spring 13 is provided within the space existing between one end of the inner cylinder 11 and the internal bottom of the rubber cylinder 12. One end of the spring 13 touches against an inner bottom of the rubber cylinder 12 for providing elasticity to the pen-tip 17. The elements in FIG. 3 corresponding to ones shown in FIG. 1 respectively perform same functions, and the functions of that are not redundantly iterated herein.

In summary, the featured virtues of the invention include:

1) The dual-layer structure of pen-tip 2, which is elastic due to the provision of the spring 13 inside the rubber cylinder 12, extends the lifetime of the touch screen pen.

2) The electrically-conductive fabric 19, which is the contact portion of the pen with the touch screen, allows a more smoothly operation of the pen over the surface of touch screen.

3) Simple structure which is easily to make.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A touch screen pen for capacitive type touch screen, for inputting commands to a capacitive type touch screen, comprising an inner cylinder forming an axial inner space therein for receiving a spring;

a jacket being sleeved onto the inner cylinder, for being gripped by a user's fingers, wherein an accommodation space is provided between the jacket and the inner cylinder;

a pen-tip having a first portion and a second portion along an axial direction, the first portion of the pen-tip being exposed for inputting commands to the capacitive type touch screen, the second portion being disposed within the accommodation space, and the jacket is tightened to fix the pen-tip to the touch screen pen, wherein a portion of the pen-tip contacting with the capacitive type touch screen is made of an electrically-conductive fabric; and an external tube, and a second accommodation space is provided between the external tube and the jacket for receiving an electrically-conductive spring, the static electricity of the user's body is conducted from his/her finger, via the external tube, the electrically-conductive spring, the jacket and the electrically-conductive fabric, to the capacitive type touch screen.

2. The touch screen pen of claim 1, wherein the pen-tip further comprises a rubber cylinder, wherein the electrically-conductive fabric is disposed to cover an external surface of the rubber cylinder.

3. The touch screen pen of claim 1, wherein one end of the spring pushes against an inner bottom of the rubber cylinder for providing elasticity to the pen-tip.

4. The touch screen pen of claim 1, wherein the touch screen pen further comprises a metal cord, disposed within the accommodation space, for tightening the second portion to an external wall of the inner cylinder, and whereby another static electricity path is provided to the capacitive type touch screen.

5. A touch screen pen for capacitive type touch screen comprising a pen-tip having a first portion and a second portion along an axial direction, the first portion of the pen-tip being exposed for inputting commands to the capacitive type touch screen, wherein a portion of the pen-tip contacting with the capacitive type touch screen is made of an electrically-conductive fabric; the touch screen pen further comprising an inner cylinder having an axial inner space formed therein for receiving a spring;

a jacket, sleeved onto the inner cylinder, for being gripped by the fingers of an user, wherein an accommodation space is provided between the jacket and the inner cylinder for receiving the second portion, the second portion is tightened by the jacket to fix the pen-tip; and an external tube, and a second accommodation space is provided between the external tube and the jacket for receiving an electrically-conductive spring, the static electricity of the user's body is conducted from his/her finger, via the external tube, the electrically-conductive spring, the jacket and the electrically-conductive fabric, to the capacitive type touch screen.

6. The touch screen pen of claim 5, wherein the pen-tip further comprises a rubber cylinder, wherein the electrically-conductive fabric is disposed to cover an external surface of the rubber cylinder.

7. The touch screen pen of claim 5, wherein the jacket has at least a groove part for tightening the second portion to an external wall of the inner cylinder.

8. A touch screen pen for capacitive type touch screen, for inputting commands to a capacitive type touch screen, comprising an inner cylinder forming an axial inner space therein for receiving a spring;

a jacket being sleeved onto the inner cylinder, for being gripped by a user's fingers, wherein an accommodation space is provided between the jacket and the inner cylinder;

a pen-tip having a first portion and a second portion along an axial direction, the first portion of the pen-tip being exposed for inputting commands to the capacitive type touch screen, the second portion being disposed within the accommodation space, and the jacket is tightened to fix the pen-tip to the touch screen pen, wherein a portion of the pen-tip contacting with the capacitive type touch screen is made of an electrically-conductive fabric, the pen-tip further comprises a rubber cylinder, wherein the electrically-conductive fabric is disposed to cover an external surface of the rubber cylinder, and the jacket having at least a groove part for tightening the second portion to an external wall of the inner cylinder;

an external tube, a second accommodation space is provided between the external tube and the jacket for receiving an electrically-conductive spring, the static electricity of the user's body is conducted from his/her finger, via the external tube, the electrically-conductive spring, the jacket and the electrically-conductive fabric, to the capacitive type touch screen.

* * * * *